(12) United States Patent
Hu et al.

(10) Patent No.: US 8,126,758 B2
(45) Date of Patent: Feb. 28, 2012

(54) METHOD AND APPARATUS FOR INFORMATION BOOSTING IN RELATED BUT DISCONNECTED DATABASES

(75) Inventors: Jianying Hu, Bronx, NY (US); Aleksandra Mojsilovic, New York, NY (US); Ana Radovanovic, New York, NY (US); Mark S. Squillante, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 12/014,414

(22) Filed: Jan. 15, 2008

(65) Prior Publication Data

US 2009/0182771 A1    Jul. 16, 2009

(51) Int. Cl.
*G06Q 10/00* (2006.01)

(52) U.S. Cl. .............. 705/7.17; 705/7.11; 705/7.12; 705/7.13

(58) Field of Classification Search ......... 705/7.11–7.42
See application file for complete search history.

(56) References Cited

U.S. PATENT DOCUMENTS

| | | | | |
|---|---|---|---|---|
| 7,054,826 | B2 * | 5/2006 | Okada et al. ............... | 705/7.12 |
| 2004/0064331 | A1 * | 4/2004 | Mayer et al. ............... | 705/1 |
| 2005/0038667 | A1 * | 2/2005 | Hileman et al. ............ | 705/1 |
| 2005/0222899 | A1 * | 10/2005 | Varadarajan et al. ....... | 705/11 |
| 2005/0234761 | A1 * | 10/2005 | Pinto et al. ................. | 705/10 |
| 2006/0282306 | A1 * | 12/2006 | Thissen-Roe ............... | 705/11 |
| 2007/0083416 | A1 * | 4/2007 | Podrazhansky ............. | 705/9 |
| 2007/0198312 | A1 * | 8/2007 | Bagchi et al. .............. | 705/7 |
| 2007/0203770 | A1 * | 8/2007 | Grosvenor et al. .......... | 705/7 |
| 2007/0208604 | A1 * | 9/2007 | Purohit et al. .............. | 705/9 |
| 2007/0265870 | A1 * | 11/2007 | Song et al. .................. | 705/1 |
| 2009/0006173 | A1 * | 1/2009 | Farrell et al. ............... | 705/9 |
| 2009/0292581 | A1 * | 11/2009 | Omiya ......................... | 705/9 |

OTHER PUBLICATIONS

Labate, F.; Medsker, L.; , "Employee skills analysis using a hybrid neural network and expert system," Developing and Managing Intelligent System Projects, 1993., IEEE International Conference on , vol., no., pp. 205-211, Mar. 29-31, 1993 doi: 10.1109/DMISP.1993. 248616   URL:   http://ieeexplore.ieee.org/stamp/stamp.jsp?tp= &arnumber=248616&isnumber=6368.*

Dhillon et al., "Information-Theoretic Co-clustering", Proc. Ninth ACM International Conference on Knowledge Discovery and Data Mining (KDD-2003), Washington D.C., Aug. 2003.

* cited by examiner

*Primary Examiner* — Jason Dunham
*Assistant Examiner* — Richard Scheunemann
(74) *Attorney, Agent, or Firm* — Scully, Scott, Murphy & Presser, P.C.; Daniel P. Morris, Esq.

(57) ABSTRACT

Method and apparatus for information boosting in related but disconnected databases, in one aspect, may comprise identifying disconnected data sources comprising data that are related or dependent on one another, determining one or more relationships and dependencies among the disconnected data, and refining the data sources based on one or more relationships and dependencies.

15 Claims, 2 Drawing Sheets

METHOD AND APPARATUS FOR INFORMATION BOOSTING IN RELATED BUT DISCONNECTED DATABASES

FIELD OF THE INVENTION

The present disclosure relates to enhancing or refining information in related but disconnected databases using various algorithms.

BACKGROUND OF THE INVENTION

Workforce management is becoming an important factor in a company's ability to deliver projects, grow revenue and be more profitable. For successful delivery of labor-based project and services, the right people with the right skills should be available to provide services when needed. Forward-thinking businesses are investing in workforce optimization methodologies and solutions as a major competitive differentiator. The implementation of an advanced workforce optimization solution is a significant financial and time investment. Such implementation may include process development including the development of skill representation and taxonomies, staffing plans and project descriptions/templates; supporting IT infrastructure, e.g., the development of databases with employee and project information, as well as application development; and the development of advanced analytics to support different operations in the workforce management cycle, including forecasting the demand for resources/projects, capacity planning and optimization, and scheduling of resources/projects. Therefore, such investments are made over a longer period of time, typically several years. Consequently, process, infrastructure and algorithm designs are often made by different decision-makers, which frequently results in disconnects between the different components and elements of the system.

What is desirable, therefore, is a system and method for identifying quality, compatibility, reliability and other relevant issues related to various data in workforce management databases, which for example, may have been collected over a period of time and/or by different players.

BRIEF SUMMARY OF THE INVENTION

A method and system for information boosting in workforce related data sources are provided. The method, in one aspect, may comprise identifying employee information data source describing a plurality of workers and associated skills, identifying project claims data source describing a plurality of past projects and associated staffing, and identifying project template data source providing information associated with a plurality of types of projects and estimated staffing for the types of projects. The method may further include estimating staffing of past projects based on the employee information data source, the project claims data source and the project template data source. The method estimates one or more assignments in which one or more employees in said past projects were engaged. The method also may include determining one or more errors in the employee information data source based on said estimated staffing of past project, and updating the employee information data source according to the identified one or more errors. The method further may include updating the project template data source based on said estimated staffing of past projects. The updated employee information data source and the updated project template data source may be used to manage workforce resources.

A system for information boosting in workforce related data sources, in one aspect, may comprise an employee information data source describing a plurality of workers and associated skills, a project claims data source describing a plurality of past projects and associated staffing, and a project template data source providing information associated with a plurality of types of projects and estimated staffing for said types of projects. A first module is operable to estimate staffing of past projects based on the employee information data source, the project claims data source and the project template data source. The first module at least estimates one or more assignments in which one or more employees in said past projects were engaged. A second module is operable to determine one or more errors in the employee information data source based on the estimated staffing of past project. A third module is operable to update the employee information data source according to the identified one or more errors and the project template data source based on the estimated staffing of past projects. A computer processor is to execute or run the first module, the second module and the third module.

A program storage device readable by a machine, tangibly embodying a program of instructions executable by the machine to perform the above method steps may be also provided.

Further features as well as the structure and operation of various embodiments are described in detail below with reference to the accompanying drawings. In the drawings, like reference numbers indicate identical or functionally similar elements.

DETAILED DESCRIPTION

A system and method that identifies quality, compatibility, reliability and other relevant issues related to the data in the workforce management databases or other data sources are disclosed. A set of statistical and optimization techniques may be provided to exploit correlation and relationships between different sources of data, for instance, to: 1) perform error-discovery and correction, 2) increase the reliability of different data inputs, and 3) refine and improve the quality of information.

In one embodiment, the following sources of data may be considered: employee information, describing the supply of workers (resources) and their skills; project claims, describing which projects have been conducted in the past and how they were staffed; and project templates, providing the information on different types of projects, and how (e.g., on average) they should be staffed.

Figure 2:
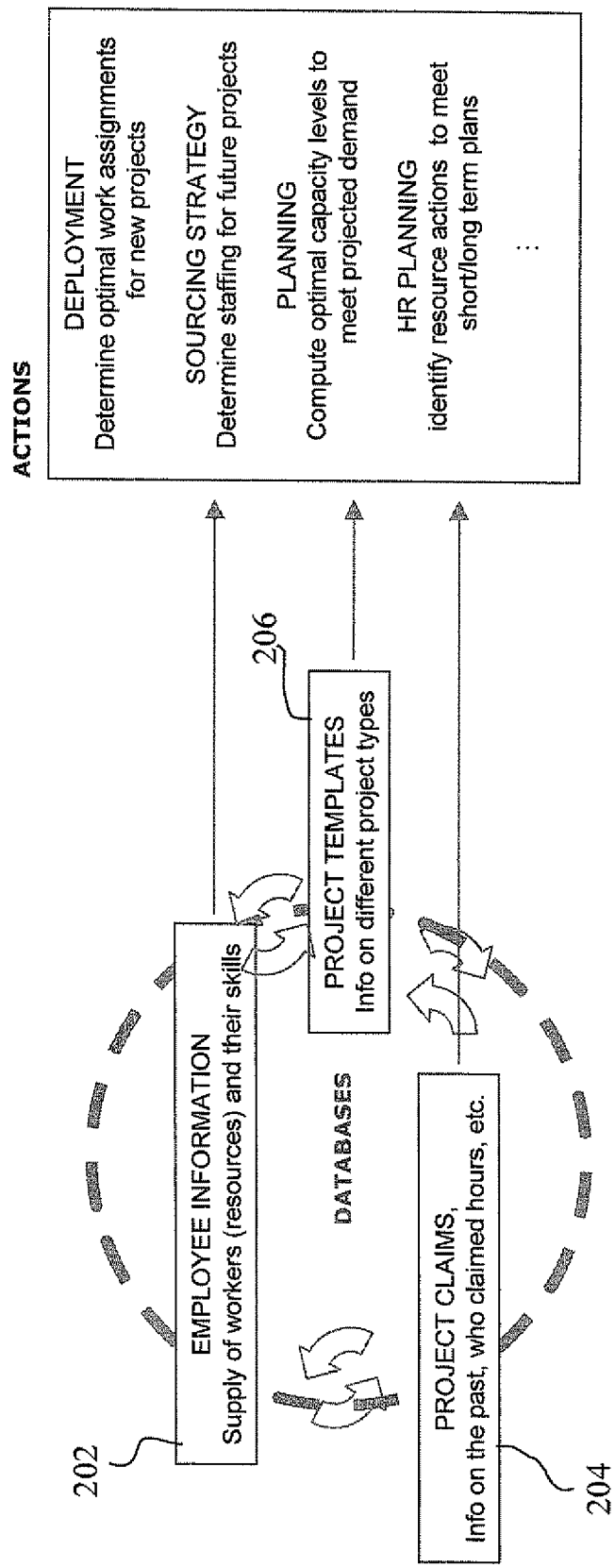
FIG. 2 illustrates examples of data sources and their use in work source management.

FIG. 2 illustrates examples of data sources. These data sources 202, 204, 206 may represent key elements in the workforce management supply chain. They may be used to, e.g.: 1) determine optimal work assignments for immediate projects, 2) determine longer-term strategy, or recommended staffing for future projects, 3) compute optimal capacity levels to satisfy projected labor demand, 4) identify actions (e.g., hiring, training, or re-skilling) to meet both short and long term demand and business objectives.

As an example, employee information 202 may include a set of employee records, $\{er_i\} i=1, \ldots, n_e$, where ne is the total number of employees. While not limited to such, each employee record $er_i$ can be described as, $er_i=\{ec_i, sa_i, (ps,ss)i\}$, where: $ec_i=1, \ldots, nc$ is the employee class variable describing the class of the employee i (examples of a class variable include employees belonging to the same business unit, employees belonging to the same department/group, employees reporting to the same manager/supervisor, etc.), nc is the number of employee classes, and $sa_i$ is the skill attribute vector describing the skill profile of the employee i, as $$sa_i = [sa_{i,1} \ldots sa_{i,ns}],$$
$$sa_{p,q} = \begin{cases} 1, & \text{employee } p \text{ has skill } q \\ 0, & \text{employee } p \text{ does not have skill } q \end{cases}$$

and ns is the total number of skills. The tuple $(ps,ss)_i$, $ps=1,\ldots,ns$, $ss=1,\ldots,ns$, specifies the primary skill, ps, and the secondary skill, ss, of the employee i. Other representations of employee information may be possible and the method of the present disclosure does not limit the data representation to particular representations or formats. Rather, the data format and representation are shown as examples herein.

As an example, project claims data 204 may include a set of project claim records $\{cr_j\}_{j=1,\ldots,nr}$, where nr is the total number of records. For each completed project j, the claim record $cr_j$ contains the information about the type of the project, duration of the engagement, and information about employees utilized on the project as $$cr_j = \{pt_j, ts_j, te_j, pd_j, ea_j\},$$

where, $pt_j \in [1 \ldots nt]$ is the project type variable describing the type of the project claimed by the claim j, nt is the total number of project types, $ts_j \in [1,T]$ is the starting week of the project, $te_j \in [1, T]$ is the ending week of the project, T is the total number of weeks covered by the claim records, $pd_j = te_j - ts_j$ is the duration (in weeks) of the project claimed by the claim j, and $ea_j$ is the employee assignment vector describing which employees have been assigned to the project as $$ea_j = [ea_{j,1} \ldots ea_{j,ne}],$$

where $ea_{p,q}$ is the time (in hours) employee q spent on the project p. It is assumed that the utilization of resources is uniformly spread out over the duration of a project, therefore the weekly assignment vector can be computed as $ea_j/40pd_j$ for the 40 hour working week for each employee. Note that in one embodiment, the employee records do not contain the information on how the employees were used on the project (i.e., which of their skills were being used), but only the information about who was used and for how long. In one aspect of a preferred embodiment, which is assumed below, an employee may be utilized on a project in multiple capacities as well as being utilized on multiple projects. However, in other aspects, there may be restrictions or conditions on whether an employee can be utilized on a project in multiple capacities, on multiple projects, etc. Other representations of project claim information may be possible and the method of the present disclosure does not limit the data representation to particular representations or formats. Rather, the data format and representation are shown as examples.

Project templates data 206 may include project template records, $\{tr_j\}_{k=1,\ldots,nt}$, where nt is the total number of project types. For each project type k, the project template specifies how long (on average) the projects of that type should last and how they should be staffed, as $$tr_k = \{dm_k, sm_k\},$$

where, $dm_k$ is the expected duration for projects of type k (in weeks), and $sm_k = [sm_{k,1} \ldots sm_{k,ns}]$ is the weekly skill requirement vector. The elements of the skill requirement vector, $sm_{p,q}$, represent the average weekly requirement for each skill q, on the project type p, expressed as a percentage of total project duration $dm_k$. Note that here it is assumed that the weekly requirements do not change over the duration of the project $sm_k$=const, however, in other aspects or embodiments of the present disclosure, staffing templates that vary over time may be allowed and supported. Other representations of project template information may be possible and the method of the present disclosure does not limit the data representation to particular representations or formats. Rather, the data format and representation are shown as examples.

In practice typically, none of the above-described three information sources is "perfect". For example, although new projects should be staffed according to the project template specification, the actual staffing can often vary due to insufficient resources or lack of certain "high-value" skills. Also, claim records often only indicate the amount of hours each employee spend on a project, without specifying what skill the employee is deployed in, which causes ambiguity when an employee has multiple skills. As a result, project claim records may show significant deviation from the specification given by the project templates.

Employee data records are not "perfect" either. The two most common types of errors in the employee records are accidental omissions and systematic errors. Accidental omissions happen when an employee accidentally misses to check a skill the employee has. Systematic errors can be of two types. Type 1 systematic errors happen when an employee deliberately does not check certain skill, as the employee does not want to be deployed in that capacity. Type 2 systematic errors happen when a group of employees is advised not to select certain skill, typically by their superiors, managers or deployment managers, as they may prefer to keep their employees "reserved" and do not want them to be utilized in other ways. The project templates can often be improved as well, as they are usually provided once by subject matter experts, or are computed by mining or clustering the project claims data from time to time, without taking into account the inconsistencies in actual staffing or changes and/or updates in employee skill information.

The present disclosure provides a methodology that exploits the relationships and dependencies between the plurality of data sources of interest (e.g., the above-described three data sources) to refine and improve the accuracy and reliability of the information. The methodology may include: 1) a scheme for determining the most likely usage of resources on the past engagements, given the employee data and recommended staffing, 2) a scheme for refining the project templates, based on the staffing information from past projects, 3) a scheme for updating employee information, and correcting the errors in the data, based on the most likely usage of resources in the past. The methodology may also include an iterative scheme, where the data is subsequently refined via these three steps, until one or more convergence criteria are met.

Skill Co-Occurrence Information

Skill information typically contains certain structure, as certain skills often occur together, or there are strong groupings among certain skill types. For example, if a software developer has Java programming skill, it is very likely that the person will also know how to program in C and C++ or can easily learn to do so. Therefore, to capture and exploit these relationships, the method in one embodiment first computes the skill co-occurrence matrix, SC, as $$SC = \{sc_{p,q}\}_{p=1,\ldots,ns,\ q=1,\ldots,ns}$$

$$sc_{p,q} = \frac{\sum_{i=1}^{ne}\begin{cases}1, & sa_{i,p}=1 \text{ and } sa_{i,q}=1\\ 0, & \text{otherwise}\end{cases}}{\sum_{i=1}^{ne} sa_{i,p}}.$$

In other words, the elements of the co-occurrence matrix, $sc_{p,q}$, represent a measure of how often skill q appears in an employee with skill p. Note that the co-occurrence matrix need not be symmetric (i.e. $sc_{p,q} \ne sc_{q,p}$), as for example, system architects can often have Java programming skills, but Java programmers are not often system architects.

Certain relationships even more frequently occur among the employees that belong to the same class, therefore for each employee class $c=1, \ldots, nc$, the method in one embodiment may also compute the class skill co-occurrence matrices $CSC_c$, as $$CSC_c = \{csc_{c,p,q}\}_{c=1,\ldots,nc,\ p=1,\ldots,ns,\ q=1,\ldots,ns}$$

$$csc_{c,p,q} = \frac{\sum_{i \in EC(c)}\begin{cases}1, & sa_{i,p}=1 \text{ and } sa_{i,q}=1\\ 0, & \text{otherwise}\end{cases}}{\sum_{i \in EC(c)} sa_{i,p}},$$

where EC(c) represents a set of employees that belong to the class c, $EC(c)=\{i|ec_i=c\}$.

Figure 1:
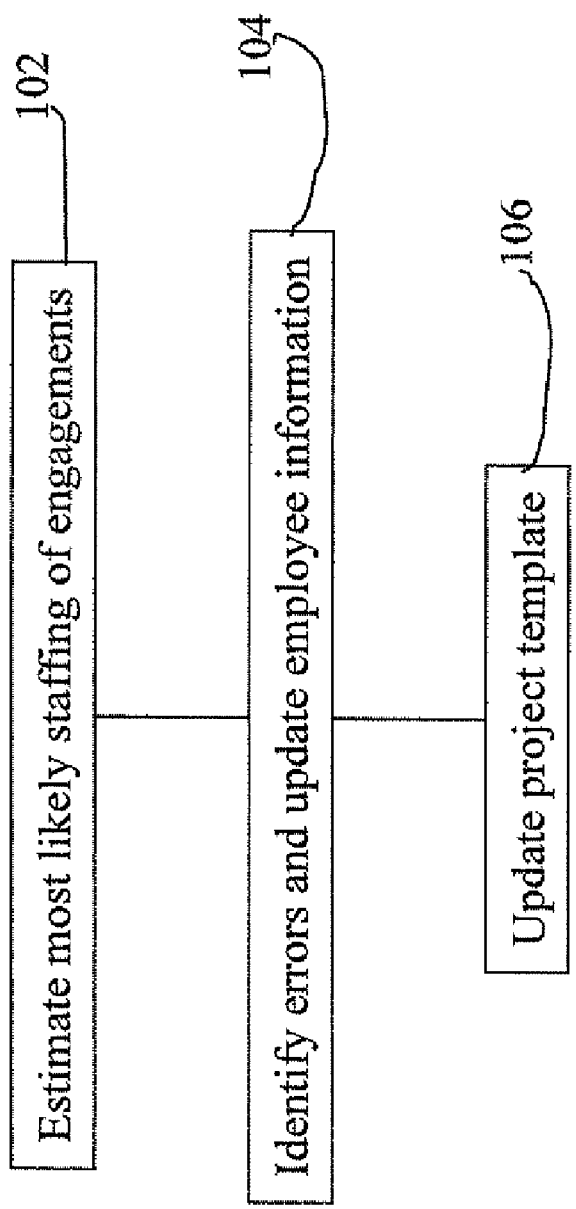
FIG. 1 is a flow diagram illustrating a method of boosting information in one embodiment of the present disclosure.

FIG. 1 is a flow diagram illustrating a method of boosting information in one embodiment of the present disclosure. At 102, the method estimating the most likely staffing of past engagements. As previously mentioned, the data about past engagements stored in project claims contains information about the type of the project, its duration, and employees utilized. However, the data may not necessarily contain the information specifying in which capacity (i.e., which skills) the employees were used. Therefore, the method of the present disclosure in one embodiment may include an example procedure for estimating the most likely assignments for the employees engaged on the past projects, based on the recommended staffing described via project templates, $\{tr_j\}_{k=1,\ldots,nr}$, employee skill data from employee records $\{er_i\}_{i=1,\ldots,ne}$, and information about the past projects from the project claims, $\{cr_j\}_{j=1,\ldots,nr}$. The method of the present disclosure, however, is not limited to this example, and can be applied more generally to any determination of employee activities or behaviors based on incomplete information from various sources.

The method first defines a staffing plan, $sp_j(t)=[sp_{j,1}(t) \ldots, sp_{j,ns}(t)]$ for each week $t \in [te_j, te_j]$ of the project j, and $sp_j(t)=0$ otherwise. The staffing plan is defined in terms of FTEs (Full Time Equivalent), obtained from the staffing template $sm_{ptj}[sm_{ptj,1} \ldots sm_{ptj,ns}]$ after applying the revenue and duration of project, and a formula which includes the utilization target U, such as $$sp_{j,i}(t)=sm_{ptj,i}(t) \times (R/(r*D*U))$$

where R is total revenue, D is the duration of the project, and r is the revenue rate (revenue/hour) for the particular type of project. From here on it shall be assumed that skill requirements are uniformly spread throughout the duration of the project (i.e., same every week), therefore $sp_j(t)=sp_j$ for all values of t within the start and end date of project j. Other representations of skill requirements throughout the duration of the project may be possible and the method of the present disclosure does not limit the staffing plans to particular representations or formats. Rather, the assumption of uniform skill requirements throughout the project duration is made to elucidate the exposition and shown as an example herein.

For each of the past projects j, from the project claims data, $\{cr_j\}_{j=1,\ldots,nr}$, the method in one embodiment defines the employee assignment matrix $B_j(t)$, for each week t of the duration of the claim horizon T, $t=1, \ldots, T$ $$B_j(t) = \{b_{j,i,q}(t)\}_{\substack{j=1,\ldots,nr\\i=1,\ldots,ne\\q=1,\ldots,ns}} = \begin{bmatrix} b_{j,1,1}(t) & \ldots & b_{j,1,ns}(t)\\ \vdots & & \\ b_{j,ne,1}(t) & \ldots & b_{j,ne,ns}(t) \end{bmatrix},$$

where $b_{j,i,q} \in [0,1]$ is the utilization of the employee i, on project j, in skill q, during week t. To determine the most likely staffing for all past projects, $$\{B_j(t)\}_{\substack{j=1,\ldots,nr\\t=1,\ldots,T}},$$

the following non-linear optimization formulation may be used $$\min_{b_{j,i,q}(t)} \sum_{j=1}^{nr} \sum_{t=1}^{T} \sum_{q=1}^{ns} \left(\sum_{i=1}^{ne} b_{j,i,q}(t) - sp_{j,q}(t)\right)^2 \quad (o1)$$

subject to:

$$\sum_{j=1}^{nr} \sum_{q=1}^{ns} b_{j,i,q}(t) \le 1 \quad t=1,\ldots,T, i=1,\ldots,ne \quad (c1.1)$$

$$\sum_{q=1}^{ns} b_{j,i,q}(t) = ea_{j,i}/40 pd_j \quad j=1,\ldots, \quad (c1.2a)$$
$$nr, i=1,\ldots,ne, t=ts_j,\ldots,te_j$$

$$b_{j,i,q}(t) = 0 \quad j=1,\ldots,nr, i=1,\ldots, \quad (c1.2b)$$
$$ne, t < ts_j, t > te_j, q=1,\ldots,ns$$

$$b_{j,i,q}(t) \quad (c1.3)$$
$$\begin{cases} \ge 0, \text{ if } sa_{i,q}=1\\ =0, \text{ if } sa_{i,q}=0 \end{cases} j=1,\ldots,nr, i=1,\ldots,ne, q=1,\ldots,ns$$

In other words, the method in one embodiment determines the most likely assignments by minimizing the total squared error between the actual staffing (total hours claimed on the project for each skill) and the recommended staffing, over all past projects. The set of constraints (c1.1) ensures that the utilization of each employee during each week does not become too large. The set of constraints (c1.2a, b) ensures that, throughout the duration of a project j, an employee i is utilized on the project j as specified by the assignment vector $ea_j$.

The set of constraints (c1.3) ensures that an employee can be utilized only in a skill the employee has, according to the skill attribute vector sa. Constraints (c1.3) do not allow employees to be utilized in any other skill than the ones specified in their skill attribute vectors. However, it can be seen that a more effective updating is achieved with an alternative, relaxed constraint $$b_{j,i,q}(t) \begin{cases} \geq 0, \text{ if } sa'_{i,q} = 1 \\ = 0, \text{ if } sa'_{i,q} = 0 \end{cases} j = 1, \ldots, \quad (c1.3a)$$

$$nr, i = 1, \ldots, ne, q = 1, \ldots, ns$$

where $sa'_{i,q}$ is an updated skill attribute information defined as $$sa'_{i,q} = \begin{cases} 1 & \text{if } sa_{i,q} = 1 \\ 1 & \text{if } sa_{i,q} = 0 \text{ and } sa_{i,p} = 1 \text{ and } sa_{p,q} > \alpha \\ 1 & \text{if } sa_{i,q} = 0 \text{ and } sa_{i,p} = 1 \text{ and } sa_{q,p} > \alpha \\ 0 & \text{otherwise} \end{cases}$$

This constraint now, takes into account the skill co-occurrence information SC, thus allowing employees to be utilized in the skills they have as well as in any of the related skills, where the strength of the relationship is defined via the parameter $\alpha \in [0,1]$. When $\alpha=1$, (c1.3a) reduces to (c1.3) (i.e., only skills from the skill profile are allowed). In the extreme case of $\alpha=0$, the optimization allows employees to be utilized in any skill, regardless of the information specified in their skill profile.

In another embodiment, an alternative optimization formulation to the one above that may be more robust to different data inputs may be used. For example, $$\min_{b_{j,i,q}(t)} \sum_{j=1}^{nr} \sum_{t=1}^{T} \sum_{q=1}^{ns} \left( \sum_{i=1}^{ne} b_{j,i,q}(t) - sp_{j,q}(t) \right)^2 + \quad (o2)$$

$$\text{scale} \sum_{j=1}^{nr} \sum_{i=1}^{ne} (\varepsilon_{j,i} - 1)^2$$

subject to:

$$\sum_{j=1}^{nr} \sum_{q=1}^{ns} b_{j,i,q}(t) \leq 1 \quad t = 1, \ldots, T, i = 1, \ldots, ne \quad (d1.1)$$

$$\sum_{q=1}^{ns} b_{j,i,q}(t) \leq ea_{j,i}/40pd_j \quad j = 1, \ldots, \quad (d1.2a)$$

$$nr, i = 1, \ldots, ne, t = ts_j, \ldots, te_j$$

$$\sum_{q=1}^{ns} b_{j,i,q}(t) \geq \varepsilon_{j,i} ea_{j,i}/40pd_j \quad j = 1, \ldots, \quad (d1.2b)$$

$$nr, i = 1, \ldots, ne, t = ts_j, \ldots, te_j$$

$$b_{j,i,q}(t) = 0 \quad j = 1, \ldots, nr, i = 1, \ldots, \quad (d1.2c)$$

$$ne, t < ts_j, t > te_j, q = 1, \ldots, ns$$

-continued $$b_{j,i,q}(t) \begin{cases} \geq 0, \text{ if } sa_{i,q} = 1 \\ = 0, \text{ if } sa_{i,q} = 0 \end{cases} j = 1, \ldots, nr, i = 1, \ldots, ne, q = 1, \ldots, ns \quad (d1.3)$$

where scale is an appropriately chosen constant large enough to satisfy employee assignment values and not "too large" to diminish the value of the first term in the objective function (o2).

In general with respect to (o1), and for example, given potential problems with the data, there may be no solution that satisfies the constraints (c1.*). This is because (c1.2a) requires equality whenever the value of b must not be 0. There may be a number of reasons why no solution satisfies this equality constraint; one example set of reasons is due to issues with the data. To address this scenario, objective function (o2) may be introduced and this equality constraint may be relaxed in the new constraints (d1.2*). Note that when epsilon is equal to 1, the constraints (d1.2a-b) recover the equality constraint. However, epsilon can be less than 1, and thus the constraints (d1.2*) makes it possible for feasible solutions to be found when this is not possible with the equality constraint. On the other hand, it is desirable to have epsilon to be as close to 1 as possible in optimizing among the feasible solutions. Thus, epsilon is included in the objective (o2). Note further that, with appropriate setting of the variable "scale", epsilon will be equal to one when the equality constraint is feasible.

It is possible that the optimization problem formulated above introduces large size of the search space. This may happen since the size of the assignment matrix is nr×ne×ns, and each attribute could be on the order of 1000 or more, and the total number of variables may quickly become unmanageable. To address this situation whenever it arises, it is observed that very often projects can be segmented into groups, where each group of projects require a similar subset of skills and are mostly staffed by the same subgroup of employees. Since there is little overlapping between these different groups, the optimization problem can be decomposed into N sub-problems where N is the total number of groups. The segmentation of projects and employees can be carried out in multiple ways. One possible solution is to use a co-clustering methodology such as the information-theoretical co-clustering method introduced in I. S. Dhillon, S. Mallela and D. S. Modha, "Information-Theoretic Co-clustering", Proc. Ninth ACM International Conference on Knowledge Discovery and Data Mining (KDD-2003), Washington D.C., August 2003. Such a method can be used to simultaneously identify clusters of projects and employees such that there is minimal "cross-over" assignments (i.e., employees from one group being assigned to projects from multiple groups). Other solutions are also possible within the present invention, such as methodologies for determining irreducible and nearly irreducible sets representing the segmentation of projects and employees.

Referring to FIG. 1, at step 104, the method updates the employee information. The methodology of the present disclosure in one embodiment may include a procedure or like for error-correcting and updating the employee data based on the estimated most likely assignments on the past projects, for example, computed in step 102. The methodology, however, is not limited to this example procedure and any procedure may be used in the methodology. In this example, the methodology considers schemes for correcting the following types of errors in the employee records: 1) single employee omissions (either accidental omissions or type 1 systematic errors), and 2) systematic errors over a group of employees (such as type 2 systematic errors). The error-correction procedures for correcting other types of errors can be easily derived in a similar manner.

Detecting Single Employee Omissions

In one embodiment, the methodology of the present disclosure uses the following example procedure to detect single employee omissions. It is noted that the procedure need not be limited to the example shown here. The methodology starts with the most likely assignment information $\{B_j\}_{j=1,\ldots,nr}$. In one embodiment, $\{B_j\}_{j=1,\ldots,nr}$ is computed by taking into account the correlated skills. For each employee i, let $P_i$ be a set of tuples (j, q) representing the index of the project on which the employee was engaged, j, and the index of the skill used on that project, q. Let $A_i(q)$ be a subset of claim records representing projects on which the employee was engaged in skill q, and $S_i$ a set of skills employee i has $$P_i = \{(j,q) | b_{j,i,q} \neq 0\},$$

$$A_i(q) = \{j | b_{j,i,q} \neq 0\},$$

$$S_i = \{q | sa_{i,q} = 1\}.$$

For each employee i, and each skill $q \notin S_i$ the skill assignment error, $sae_i(q)$, and skill correlation error, $sce_i(q)$, are computed as:

$$sae_i(q) = \frac{1}{\vartheta(P_i)} \left( \sum_{j \in A_i(q)} (1[b_{j,i,q} > 0] - sa_{i,q})^2 \right)^{0.5},$$

$$sce_i(q) = \max_{p \in S_i} sc_{p,q},$$

where, $\vartheta(P_i)$ denotes the number of elements in $P_i$ and $1[b_{j,i,q} > 0]$ is equal to one in case $b_{j,i,q} > 0$ or zero otherwise. In other words, the skill assignment error represents a measure of how often an employee has been assigned in a skill the employee does not have. A high value of $sae_i(q)$ indicates that although employee i did not check skill q, the employee has often been utilized in that capacity. A high value of $sce_i(q)$ indicates that skill q is highly correlated with some of the skills employee i has. Therefore, if both the skill assignment error and skill correlation error are larger than some predefined thresholds, $sae_i(q) > \beta$ and $sce_i(q) > \gamma$, we declare that employee i does have skill q and correct the skill information by setting the attribute $sa_{i,q}$ in the skill attribute vector sa to one. To record the changes in the employee records, for each employee i, we will introduce a skill attribute change indicator, $isa_i = [isa_{i,1} \ldots isa_{i,ns}]$, where $isa_{i,q} = 0$ indicates that the skill q has not been updated (no change in the skill attribute $sa_{i,q}$), while $isa_{i,q} = 1$ indicates that $sa_{i,q}$ has been changed as a result of the error-correction procedure, The error-correction procedure can be formulated as an integer programming problem in the following way. For example, define the skill attribute matrix for all employees, $SA = \{sa_i\}_{i=1,\ldots,ne}$. The new, error-corrected skill attribute matrix, SA', can be found by minimizing the following objective function $$\min_{SA} \sum_{i=1}^{ne} \sum_{(j,q) \in P_i} (1[b_{j,i,q} > 0] - sa_{i,q})^2 \quad (o3)$$

subject to:

$$sae_i(q) = \frac{1}{\vartheta(P_i)} \left( \sum_{j \in A_i(q)} (1[b_{j,i,q} > 0] - sa_{i,q})^2 \right)^{0.5} < \beta \ i = 1, \ldots, \quad (c2.1)$$

$$ne, \forall q \notin S_i$$

$$sce_i(q) = \max_{p \in S_i} sc_{p,q} < \gamma \ i = 1, \ldots, ne, \forall q \notin S_i \quad (c2.2)$$

One way of detecting that an employee is engaged in a project with a skill, which is not in his/her list of assigned skills, is by observing the solution of the optimization problem with objective (o2). Even though the nature of the optimization drives solutions $\epsilon_{j,t}$ to be as close as possible to 1 in order to match the inputted employee assignment values $e_{j,i}$, for some indices j,i it is not going to be possible and the epsilon values will be small. These cases correspond to scenarios where employees are assigned to projects with skills not registered in the list of their available skills.

Referring back to FIG. 1, at step 106, the method updates project templates. The next step in the data refinement process updates the project template records, $tr_k = \{dm_k, sm_k\}$, $k \in [1 \ldots nt]$. Ideally, each project template can be seen as cluster center of all past projects of type k. Let $T_k = \{j | pt_j = k\}$ be a set of all past projects of type k, Then the cluster centers, and the new, updated template records, $tr'_k = \{dm'_k, sm'_k\}$ can be computed as $$dm'_k = \frac{\sum_{j \in T(k)} pd_j}{\vartheta(T(k))}$$

$$sm'_k = \frac{\sum_{j \in T(k)} sm_j}{\vartheta(T(k))}$$

where $\vartheta(T(k))$ is the cardinality of set T(k). However, as mentioned previously, due to the inability to find resources at the deployment time, or attempts to minimize the cost by reducing the actual headcount, or utilizing less costly skills, there could be a significant amount of uncertainty in how past projects are staffed. Therefore, it is desirable to also have new templates, $tr'_k$, to remain as close as possible to the existing templates $tr_k$, and perform only "necessary" adjustments. To capture these trade-offs, in one representative example we determine the new project templates $tr'_k$ as $$\min_{tr'} \sum_{k=1}^{nt} (dm_k - dm'_k)^2 + \sum_{i=1}^{ns} (sm_{k,i} - sm'_{k,i})^2 \quad (o4)$$

subject to:

$$dm'_k - \frac{\sum_{j \in T(k)} pd_j}{\vartheta(T(k))} < \delta \ k = 1, \ldots, nt, \quad (c3.1)$$

$$sm'_k - \frac{\sum_{j \in T(k)} sm_j}{\vartheta(T(k))} < \theta \ k = 1, \ldots, nt. \quad (c3.2)$$

The methodology of the present disclosure, however, is not limited to this example and can be applied more generally.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of information boosting in workforce related data sources, comprising:
    identifying employee information data source describing a plurality of workers and associated skills;
    identifying project claims data source describing a plurality of past projects and associated staffing;
    identifying project template data source providing information associated with a plurality of types of projects and estimated staffing for said types of projects;
    estimating, by a processor, staffing of past projects based on said employee information data source, said project claims data source and said project template data source, said estimating including at least estimating one or more assignments in which one or more employees in said past projects were engaged;
    determining one or more skill assignment errors in the employee information data source based on said estimated staffing of past project, wherein determining said one or more skill assignment errors include computing a measure of frequency of an employee being assigned in a skill that is not associated with the employee according to the employee information data source, and calculating a correlation of the skill not associated with the employee to one or more skills associated with said employee;
    updating said employee information data source according to said identified one or more errors; and
    updating said project template data source based on said estimated staffing of past projects,
    wherein the step of updating the employee information data source includes updating said employee information data source if said one or more skill assignment errors meet a predetermined threshold.

2. The method of claim 1, further including:
    iterating the steps of estimating, updating said employee information data source and updating said project template data source until one or more convergence criteria is met.

3. The method of claim 1, wherein said estimating one or more assignments in which one or more employees in said past projects were engaged includes minimizing total squared error between actual staffing and recommended staffing identified in the project template data source subject to one or more predetermined constraints.

4. The method of claim 3, wherein said one or more predetermined constraints include a set of constraints that utilize an employee only in a skill the employee has.

5. The method of claim 3, wherein said one or more predetermined constraints include a set of constraints that utilize an employee in a skill the employee has and one or more second skills related to the skill.

6. The method of claim 1, wherein the step of determining one or more errors in the employee information data source includes:
    minimizing deviation from said estimated one or more assignments of an employee and one or more skills associated with the employee recorded in the employee information data source.

7. The method of claim 1, wherein the step of updating project template data source includes:
    optimizing one or more tradeoffs between the project template data source and said estimated staffing of past projects.

8. The method of claim 1, further including using one or more statistical and optimization algorithms to perform the steps of estimating and determining.

9. The method of claim 8, wherein said optimization algorithms are decomposed into a plurality of optimization problems.

10. The method of claim 9, wherein said optimization algorithms are decomposed using a co-clustering methodology to simultaneously identify a plurality of clusters of projects and employees with minimal cross-over of assignments.

11. The method of claim 1, further including using non-linear optimization formulation to estimate one or more assignments in which one or more employees in said past projects were engaged.

12. The method of claim 1, wherein said one or more errors include single employee omissions and the step of updating said employee information data source includes correcting said single employee omissions.

13. A program storage device readable by a machine, tangibly embodying a program of instructions executable by the machine to perform a method of information boosting in workforce related data sources, comprising:
    identifying employee information data source describing a plurality of workers and associated skills;
    identifying project claims data source describing a plurality of past projects and associated staffing;
    identifying project template data source providing information associated with a plurality of types of projects and estimated staffing for said types of projects;
    estimating, by a processor, staffing of past projects based on said employee information data source, said project claims data source and said project template data source, said estimating including at least estimating one or more assignments in which one or more employees in said past projects were engaged;

determining one or more skill assignment errors in the employee information data source based on said estimated staffing of past project, wherein determining said one or more skill assignment errors include computing a measure of frequency of an employee being assigned in a skill that is not associated with the employee according to the employee information data source, and calculating a correlation of the skill not associated with the employee to one or more skills associated with said employee;

updating said employee information data source according to said identified one or more errors; and updating said project template data source based on said estimated staffing of past projects, wherein the step of updating the employee information data source includes updating said employee information data source if said one or more skill assignment errors meet a predetermined threshold.

14. The program storage device of claim 13, further including:

iterating the steps of estimating, updating said employee information data source and updating said project template data source until one or more convergence criteria is met.

15. A system for information boosting in workforce related data sources, comprising:

employee information data source describing a plurality of workers and associated skills;

project claims data source describing a plurality of past projects and associated staffing;

project template data source providing information associated with a plurality of types of projects and estimated staffing for said types of projects;

a first module operable to estimate staffing of past projects based on said employee information data source, said project claims data source and said project template data source, said first module operable to at least estimate one or more assignments in which one or more employees in said past projects were engaged;

a second module operable to determine one or more skill assignment errors in the employee information data source based on said estimated staffing of past project, wherein said one or more skill assignment errors are determined at least by computing a measure of frequency of an employee being assigned in a skill that is not associated with the employee according to the employee information data source, and calculating a correlation of the skill not associated with the employee to one or more skills associated with said employee;

a third module operable to update said employee information data source according to said identified one or more errors and said project template data source based on said estimated staffing of past projects, wherein the step of updating the employee information data source includes updating said employee information data source if said one or more skill assignment errors meet a predetermined threshold; and a computer processor operable to execute said first module, said second module and said third module.

* * * * *